United States Patent
Fletcher

(10) Patent No.: US 7,841,482 B2
(45) Date of Patent: Nov. 30, 2010

(54) FLUID FLOW CONNECTOR

(75) Inventor: Richard Edmond Fletcher, Leominster (GB)

(73) Assignee: Mangar International Limited, Presteigne (GB)

( * ) Notice: Subject to any disclaimer, the term of this patent is extended or adjusted under 35 U.S.C. 154(b) by 800 days.

(21) Appl. No.: 10/591,887

(22) PCT Filed: Mar. 7, 2005

(86) PCT No.: PCT/GB2005/000899

§ 371 (c)(1),
(2), (4) Date: Jun. 22, 2007

(87) PCT Pub. No.: WO2005/085062

PCT Pub. Date: Sep. 15, 2005

(65) Prior Publication Data

US 2008/0018100 A1     Jan. 24, 2008

(30) Foreign Application Priority Data

Mar. 5, 2004    (GB) ................................ 0405008.4

(51) Int. Cl.
*B65D 51/16* (2006.01)
(52) U.S. Cl. ........................... 220/203.01; 220/203.07; 220/203.11; 220/203.23

(58) Field of Classification Search ............ 220/203.01, 220/203.07, 203.11, 203.23, 203.24, 203.28
See application file for complete search history.

(56) References Cited

U.S. PATENT DOCUMENTS

| 4,583,643 | A | * | 4/1986 | Sanderson | 206/438 |
| 4,766,628 | A | * | 8/1988 | Walker | 5/706 |
| 5,121,840 | A | * | 6/1992 | Schram | 206/522 |
| 5,351,711 | A | * | 10/1994 | Peter | 137/232 |
| 6,990,994 | B2 | * | 1/2006 | Reeb et al. | 137/223 |

* cited by examiner

*Primary Examiner*—Anthony Stashick
*Assistant Examiner*—Madison L Wright
(74) *Attorney, Agent, or Firm*—Chernoff, Vilhauer, McClung & Stenzel, LLP

(57) ABSTRACT

Fitting for attachment to a membrane of an inflatable device comprises a mounting adapter (1) to be secured to said membrane. A resiliently deformable part (5c) associated with said mounting adapter is arranged to embrace and hold an initially separate insert (2). The resiliently deformable part (5c) is arranged such that when the mounting adapter is secured to the membrane and exposed to a force exerted by fluid at one of two sides of the membrane, the resiliently deformable part is urged into applying engagement with the insert (2). A variety of different inserts (2) having different valve arrangements can be held by the mounting adapter.

30 Claims, 2 Drawing Sheets

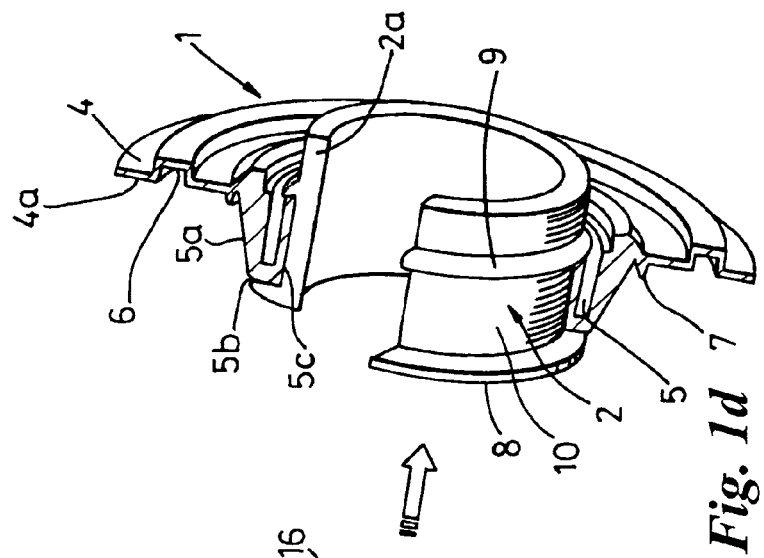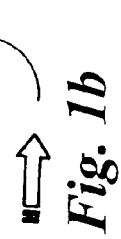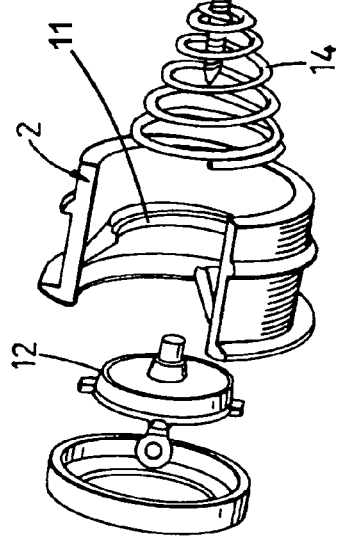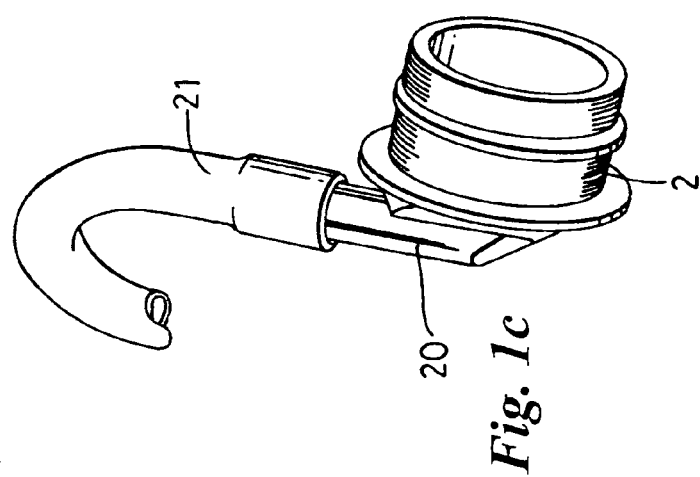

FLUID FLOW CONNECTOR

Figure 2:
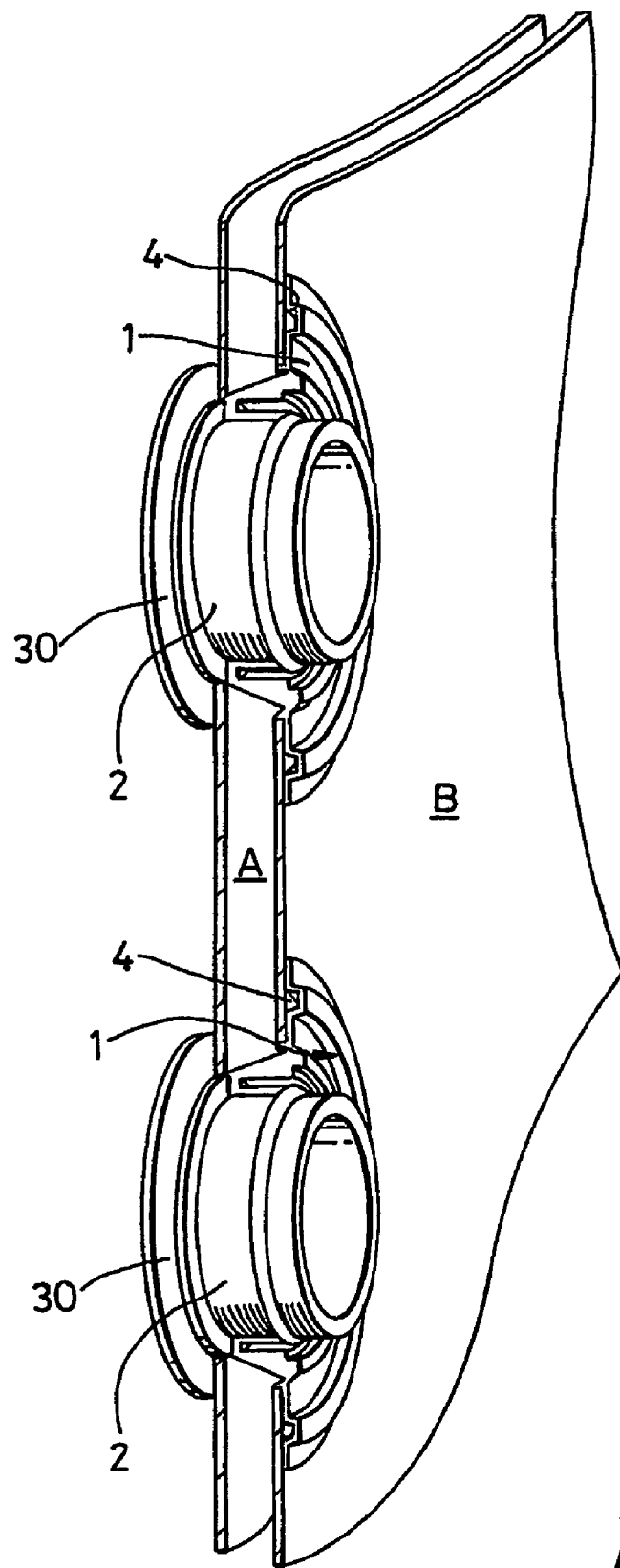

This invention relates to fittings for attachment to membranes of the kind used to fabricate inflatable structures, for example temporary water tanks, boats and bathing aids.

Such fittings, usually fall into two categories: firstly those designated to a single function, for example a pressure relief valve, which is normally non-removably fitted during the manufacture of the structure of which the membrane forms a part, by clamping, bonding or welding and which are intended to remain as part of the product throughout its useful life. Secondly, fittings including threaded flanges can be used which are clamped, bonded or welded to the membrane into which an adapter or connector can be attached and which is subsequently removable from the membrane for service or maintenance purposes.

A problem arises with known fittings of the first type mentioned above in that they have to be fitted to the membrane in the early stages of the manufacturing process and can then be difficult to service. This can lead to the replacement of a whole structure to which the fitting is connected, if the fitting fails. A further problem associated with fittings of the first type is that there may be a compromise between the material requirements of the relief valve, for example and the compatibility required to attach the fitting to the structure's membrane. Known fittings of the above mentioned second type can be vulnerable to the adaptor being unsecured or removed while the structure is in use, leading in some circumstances, to a potentially dangerous escape of fluid contained within the structure. Furthermore, fittings of this type, and the adaptors for connection thereto, can be expensive to manufacture because of the close tolerances necessary for the threads in both of the components to cooperate accurately.

The object of the invention is to overcome, or at least minimise, the problems associated with the known fittings of the first and second type set out above.

According to the invention there is provided a fitting for attachment to a membrane, said fitting comprising a mounting adaptor to be secured to such membrane, a resiliently deformable part associated with said mounting adaptor and arranged to embrace and hold an initially separate insert, said resiliently deformable part being arranged such that when the mounting adaptor is secured to said member and exposed to a force of a fluid exerted by fluid at one of two sides of the membrane, the resiliently deformable part is urged into gripping engagement with the insert.

The fitting for attachment to a membrane forming part of a structure comprises a mounting adaptor to be secured to such membrane and being provided with a resiliently deformable part arranged to embrace and hold an initially separate insert, said resiliently deformable part being arranged, such that when the mounting adaptor is secured to said structure it is exposed to a force of a fluid held within the structure urging the mounting adaptor into gripping engagement with the insert.

This arrangement enables different types of inserts to be used with the mounting adaptor and the insert which is fitted to a mounting can be replaced with an insert of the same type or a different type if necessary.

Thus, it is intended that the insert will take the form of the functional part of the fitting.

Preferably, the mounting adaptor is arranged to be secured in an aperture formed in the membrane of the structure, the said resiliently deformable part of said mounting adaptor projecting into the interior of the structure so that, in use, it can be exposed to the pressure of air or gas or liquid held within the interior of the structure.

The mounting adaptor preferably has a flange arranged to be secured to the membrane of the structure. The flange may be formed from a weldable material whereby it may be welded to the membrane of the structure, for example if the device is to be made from a plastics or plastics-coated material. Preferably, the flange is provided with an annular channel for holding a rigid ring. More preferably, the flange is provided with two annular weld areas either side of said channel. Preferably, the flange is provided with an annular lip for locating the mounting adaptor within an aperture of said membrane and which upon melting welds the edges of the aperture to the mounting adaptor. Preferably, the lip is bonded to the flange.

The insert is preferably cylindrical and the central part of the mounting has the form of a correspondingly shaped sleeve. An axial end of the sleeve is preferably joined by a radially extending web to an outer cylindrical part which is in turn joined to the flange. In use, the sleeve is flexibly connected to the outer cylindrical part at the axial end furthest from the membrane. Preferably, said sleeve makes contact with the fluid in the structure.

The central part of the mounting preferably has a circumferential recess which receives the insert. The insert is preferably hollow so that it provides a fluid flow conduit or can be constructed as a functional device such as, for example, a valve or a support means for the structure. A support means may have, for example, one or more suction pads to enable the structure to be affixed to a surface.

Preferably the fitting can be formed from an elastomeric material and may be formed by injection moulding. The fitting can be attached to the membrane by welding, for example radio frequency, ultrasonic, laser or direct thermal welding, or in any other way such as for example, by adhesive bonding using a suitable adhesive.

In a further aspect of the invention, two or more fittings may be connected by enclosed structures attached between the fittings providing a flow path for the fluid held within the structures. Two or more separate structures having fittings can therefore be connected in this manner.

The invention will now be described by way of example only and with reference to the accompanying drawings, in which:—

FIG. 1*d* is a perspective view, partly cut-away, of a preferred form of fitting embodying the invention. FIG. 1*d* shows a plain insert mounted in the fitting. FIGS. 1*a*, 1*b* (partly cut-away) and 1*c* show three alternate forms of insert which may also be fitted, FIG. 2 shows fittings in accordance with the present invention being used to join adjacent membranes of adjacent structures.

Referring now to the figures, FIG. 1*d* of the drawings shows a fitting according to the invention comprising a mounting in the form of a housing 1 adapted for attachment to an inflatable air bag or other structure and a plain insert 2 fitted in the housing. The structure may for example be a structure for holding water. Alternate forms of insert 2 are illustrated in FIGS. 1*a*, 1*b* and 1*c*. Preferably the housing and the insert are formed from moulded plastics material but of course it will be understood that these structures can be formed from any suitable material as desired or as appropriate.

The housing 1 comprises a flange 4 which extends around a central part 5. The flange 4 has an inner face 4*a* which is intended to be welded to an inside portion of the wall of a structure surrounding a circular hole in the structure through which the central part extends to the exterior of the structure, the wall of the structure being made of a flexible impermeable material such as a plastics material or a plastics coated fabric of, for example, "Nylon".

The flange 4 is shaped to form between its inner and outer edges an inwardly projecting annular channel 6 for accommodating a reinforcing ring (not shown). The reinforcing ring assists in ensuring that the housing is not distorted by stress caused by the pressure of the inflatable structure and therefore ensures correct positioning of the housing to the membrane of the inflatable structure. The provision of the channel 6 also creates two narrow annular weld areas at opposite sides of the channel 6. The use of two annular weld areas either side of said channel add security to the connection of the fitting to the material and the said areas together provide a greater spread of any load applied to the weld into a maximum area of the fabric of the structure. The provision of the annular channel 6, also enables a pressure test to be carried out on the welds of the housing 1 by providing a position to pressure test the joint between the flange and membrane of the structure.

Adjacent to the inner edge of the flange 4, where it is joined to the central part 5, there is formed an outwardly directed annular lip 7. This lip 7 serves to locate and, by melting when welded, seals the edge of the circular hole in the membrane of the structure through which the central part 5 extends.

The central part 5 of the housing 1 is generally U-shaped in section to provide an outer cylindrical part 5a flexibly connected by a radial web 5b to an inner sleeve-like cylindrical part 5c. Outer cylindrical part 5a is rigid with respect to the inner cylindrical part 5c which is a resiliently deformable part. Part 5c projects into the interior of the fluid filled structure. The outer part 5a is thicker than the inner part 5c and of the flange 4 and is preferably of tapering form in section so that it maximises the connector's tolerance to distortion and resists crushing of the connector. A crush ring can also be provided which is attached to the outer cylindrical part 5a and which acts to increase the resistance to any crushing of the connector.

Parts 5b and 5c act together to seal the fitting so as to prevent fluid ingress or egress from the structure. Furthermore, when formed from an elastomeric material, the parts 5b and 5c assist in providing a positive engagement and security of engagement between the insert 2 and the housing.

The insert 2 comprises a cylindrical portion 2a which has an external diameter substantially the same as the internal diameter of the inner part 5c of the housing 1 so that it is embraced by the latter. The portion 2a is formed externally with two spaced circumferential ribs 8, 9, one at the inner end of the portion and the other at a spacing from the outer end of the portion. These ribs form an external circumferential recess 10 which receives the circumferential part 5c of the housing, the ribs engaging opposite ends of the circumferential part to hold the insert in the housing. The insert is a snap-in fit in the housing, said part 5c being resiliently deformed as the insert is pushed into the housing. Sealing points SP between the insert 2 and the housing 1 are formed at each end of inner sleeve-like cylindrical part 5c by the action of part 5c resiliently gripping the recess 10.

The arrangement of the recess 10 and the circumferential part 5c of the housing enable the insert to be fitted the other way round in the housing. For example, if the valve contained in the insert is a one-way valve it can be fitted so that it permits fluid to flow into or out of the structure.

The arrangement of the thinner section cylindrical part 5c of the housing, which is resiliently deformable, and its connection to the thicker part 5a by the thin section part 5b allows the housing and the insert to move independently of one another. Also, the central part 5 of the housing is exposed to the pressure of the fluid in the structure so that it is urged into gripping engagement with the insert. Moreover the grip exerted by the central part on the insert increases as the fluid pressure in the structure increases. This enhances the seal between the housing and the insert and allows a relatively soft plastics compound to be used for the housing, which makes insertion and removal of the insert into and from the housing easier. The insert is also held more securely in the housing when the structure is pressurised.

The plastics material from which the housing is made will be chosen to be compatible with the material of the structure to which it is to be welded or otherwise attached. The connector material can be of any material chosen to be compatible with its function.

A valve provided in the insert may take various forms. Two examples are shown in FIGS. 1a and 1b.

In the valve in FIG. 1a, the insert 2 is formed internally with an inwardly projecting valve seat 11 having an inner face arranged to cooperate with a circular valve member 12. This valve member is attached by a screw 13 to a tapered coil spring 14 the inner end of which bears against an outer face of the valve seat 11 so that the valve member is normally urged by the spring into engagement with the inner face of the valve seat.

This valve acts as a pressure relief valve.

The valve in FIG. 1b comprises a resilient valve member 16 having a central stem 17 which is held in an aperture formed in a crosspiece 18 moulded integrally with the insert 2. This valve is normally used to provide means of inflation and deflation of an inflatable structure whilst providing an airtight seal in normal use.

A further form of an insert 2 is shown in FIG. 1c. It shows an insert having a means 20 for attaching an inflation tube 21 to the insert. Means 20 can thus be inserted into the tube 21 to provide a connection to the insert 2. The free end of the tube can then be connected to a pump and the inflatable body to which the inset is attached can be deflated or inflated accordingly.

In FIG. 2 it is shown that one, or more, fittings according to the invention can be mounted so as to link together adjacent membranes by extending the fittings through adjacent apertures in the respective membrane of adjacent containers. In this way more than one structure can be connected using the fitting of the invention. The same numerals used in FIGS. 1a, 1b, 1c and 1d are also used in FIG. 2 when referring to the same features. An alternative form of insert 2 having a weldable flange 30 is shown welded to a membrane wall A of a container. Flange 4 of housing 1 is welded to membrane wall B of an adjacent container. Insert 2 can be fitted into the housing 1, thereby enabling fluid and mechanical connections between adjacent containers.

It is of course to be understood that the invention is not to be restricted to the details of the above embodiments which have been described by way of example only.

The invention claimed is:

1. A fitting for attachment to a membrane, said fitting comprising a mounting adapter to be secured to said membrane, a resiliently deformable part associated with said mounting adaptor and arranged to embrace and hold an initially separate insert, in which said resiliently deformable part is a cylindrical element and the initially separate insert comprises a substantially cylindrical portion, the cylindrical portion having an outer surface having an outer diameter and the deformable cylindrical element has an inner surface with an inner diameter which allows the cylindrical portion of the insert to be inserted into the resiliently deformable element, the deformable element being arranged such that when the mounting adaptor is secured to said membrane and exposed to pressure exerted by fluid at one of two sides of the membrane, the inner surface of the resiliently deformable element is urged into gripping engagement with the outer surface of the cylindrical portion of the insert, wherein the resiliently deformable cylindrical element comprises a sleeve for receiving the insert, said sleeve joined by a radially extending web to an outer cylindrical part of the mounting adapter and the outer cylindrical part is substantially rigid relative to the resiliently deformable part.

2. A fitting as claimed in claim 1 wherein the mounting adaptor is provided with a flange for arranging and securing the fitting to the membrane.

3. A fitting as claimed in claim 2 wherein the flange is formed from a weldable material whereby it may be welded to the membrane of the structure.

4. A fitting as claimed in claim 2 or claim 3 wherein the flange is provided with an annular channel.

5. A fitting as claimed in claim 4 wherein the flange is provided with a rigid ring.

6. A fitting as claimed in claim 4 wherein the flange is provided with two annular weld areas on either side of the channel.

7. A fitting as claimed in claim 2 wherein the resiliently deformable part is joined to the flange.

8. A fitting as claimed in claim 1 wherein the resiliently deformable cylindrical element comprises a sleeve for receiving the insert, said sleeve joined by a radially extending web to an outer cylindrical part of the mounting adaptor.

9. A fitting as claimed in claim 8 wherein the outer cylindrical part is substantially rigid relative to the resiliently deformable part.

10. A fitting as claimed in claim 8 wherein an axial end of the sleeve is flexibly connected to the outer cylindrical part.

11. A fitting as claimed in claim 10 which when attached to a membrane the axial end furthest from the membrane of the sleeve is flexibly connected to the outer cylindrical part.

12. A fitting as claimed in claim 1 wherein the substantially cylindrical portion of the insert is provided with a pair of spaced circumferential ribs on its outer surface, the ribs defining a circumferential recess therebetween in which the resiliently deformable cylindrical element of the mounting adaptor is received.

13. A fitting as claimed in claim 1 wherein the substantially cylindrical portion of the insert is provided with ribs to engage with said resiliently deformable cylindrical element.

14. A fitting as claimed in claim 1 wherein the insert module is hollow.

15. A fitting as claimed in claim 1 wherein the insert comprises a valve means.

16. An assembly comprising a fitting in accordance with claim 1 for attachment to a membrane of an inflatable structure.

17. A fitting for attachment to a membrane, said fitting comprising a mounting adaptor to be secured to said membrane, an initially separate insert module for mounting in the adaptor, the mounting adaptor having a resiliently deformable part arranged to embrace and hold the insert module in fluid tight engagement with the adaptor when inserted, said resiliently deformable part being arranged for snap-fit co-operation with a correspondingly defined outer profile portion of the insert module to hold the insert module in the mounting adaptor, the arrangement being such that any one of a number of different types of insert module, each having a suitably defined outer profile portion for co-operation with the resiliently deformable portion, can be inserted in the mounting adaptor.

18. A fitting as claimed in claim 17, in which the resiliently deformable part of the mounting adaptor is arranged such that when the mounting adaptor is secured to said membrane and exposed to pressure exerted by fluid at one of two sides of the membrane, the resiliently deformable part is urged into tighter gripping engagement with the insert module.

19. A fitting for attachment to a membrane, said fitting comprising a mounting adapter to be secured to said membrane, a resiliently deformable part associated with said mounting adaptor and arranged to embrace and hold an initially separate insert, in which said resiliently deformable part is a cylindrical element and the initially separate insert comprises a substantially cylindrical portion, the cylindrical portion having an outer surface having an outer diameter and the deformable cylindrical element has an inner surface with an inner diameter which allows the cylindrical portion of the insert to be inserted into the resiliently deformable element, the deformable element being arranged such that when the mounting adaptor is secured to said membrane and exposed to pressure exerted by fluid at one of two sides of the membrane, the inner surface of the resiliently deformable element is urged into gripping engagement with the outer surface of the cylindrical portion of the insert, wherein the substantially cylindrical portion of the insert is provided with a pair of spaced circumferential ribs on its outer surface, the ribs defining a circumferential recess therebetween in which the resiliently deformable cylindrical element of the mounting adapter is received.

20. A fitting as claimed in claim 19 wherein the deformable cylindrical element is received in the recess between the circumferential ribs with a snap fit to prevent the insert being withdrawn from the mounting adapter.

21. A fitting as claimed in claim 19 wherein the mounting adapter is provided with a flange for arranging and securing the fitting to a membrane.

22. A fitting as claimed in claim 21 wherein the flange is formed from a weldable material whereby it may be welded to the membrane of the structure.

23. A fitting as claimed in claim 21 or 22 wherein the flange is provided with an annular channel.

24. A fitting as claimed in claim 23 wherein the flange is provided with a rigid ring.

25. A fitting as claimed in claim 23 wherein the flange is provided with two annular weld areas on either side of the channel.

26. A fitting as claimed in claim 21 wherein the resiliently deformable part is joined to the flange.

27. A fitting as claimed in claim 19 wherein the substantially cylindrical portion of the insert is provided with ribs to engage with said resiliently deformable cylindrical element.

28. A fitting as claimed in claim 19 wherein the insert module is hollow.

29. A fitting as claimed in claim 19 wherein the insert comprises a valve means.

30. An assembly comprising a fitting in accordance with claim 19 for attachment to a membrane of an inflatable structure.

* * * * *